United States Patent [19]
Aguinet et al.

[11] 3,874,645
[45] Apr. 1, 1975

[54] PERMEABLE LAMINATED COMPOSITE UNIT FOR PHYSICO-CHEMICAL PROCESSING

[75] Inventors: Gerard Aguinet, Meudon; Jean Manoury, Ville D'Avray; Edouard Martin, Saint Cloud, all of France

[73] Assignee: Societe Anonyme Products Chimiques Ugine Kyhlman, Paris, France

[22] Filed: Oct. 9, 1973

[21] Appl. No.: 404,154

Related U.S. Application Data

[63] Continuation-in-part of Ser. No. 175,588, Aug. 27, 1971.

[30] Foreign Application Priority Data
Sept. 4, 1970   France .............................. 70.32304

[52] U.S. Cl. ............................... 267/112, 23/288 R
[51] Int. Cl. .............................................. B01j 9/04
[58] Field of Search ........... 267/110, 112; 23/288 R, 23/288 F

[56] References Cited
UNITED STATES PATENTS

| | | | |
|---|---|---|---|
| 1,734,696 | 9/1930 | Bernstein | 263/112 |
| 2,156,422 | 5/1939 | Border | 23/288 R |
| 2,988,137 | 6/1961 | Richardson | 267/110 |
| 3,077,149 | 2/1963 | Eckel | 267/112 |
| 3,790,350 | 2/1974 | Haensel | 23/288 F |

*Primary Examiner*—James R. Marbert
*Attorney, Agent, or Firm*—Hammond & Littell

[57] ABSTRACT

Use is made, in order to support a sheet of a material active in a chemical or physical process operated at widely varying temperatures, process contemplated for example a catalytic gauze made of a precious metal in the case of the catalytic oxidation of ammonia, of an "articulated" cloth consisting of helixes of wire made of a refractory metal alloy, said helixes being assembled in a parallel direction with respect to one another through "screwing" of the adjacent helixes with one another, said cloth being stretched, with an extension of approximately 2% in length in all directions, in a frame of appropriate shape.

3 Claims, 3 Drawing Figures

PERMEABLE LAMINATED COMPOSITE UNIT FOR PHYSICO-CHEMICAL PROCESSING

PRIOR APPLICATION

This application is a continuation-in-part of our co-pending, commonly assigned U.S. patent application Ser. No. 175,588 filed Aug. 27, 1971.

The invention relates to permeable, laminated, composite units for chemical or physical processing at temperatures varying within wide ranges. "Permeable, laminated composite units" as used herein refers to assemblies comprising a latticed or similar support on which is applied a sheet of a material which is chemically or physically active in the process contemplated.

Characteristic examples of such assemblies include, in the first place, those comprising precious metal gauzes, used for the catalysis of certain chemical reactions, particularly in the gas phase, carried on a latticed support, said support providing the assembly with a mechanical strength which the gauze by itself does not offer. The following description will deal practically exclusively with such assemblies. However, the invention must not be considered as being limited to this specific type of unit for it also applies to assemblies consisting of a support and, for example, a sheet of filtering material or material acting in any other manner in a physical or chemical processing operation on fluids which may possibly contain solids as more or less fine suspensions.

The constitution of the catalytic assemblies of the type contemplated above, and, in particular, of those to be used for the catalytic oxidation of ammonia, whether or not under pressure, raises problems which are difficult to solve because of the large temperature differences to which they are subjected, thus giving rise to heavy stresses.

Indeed, precious metal gauzes used as catalysts are very fine and very fragile mechanically. They must therefore be maintained very flat and be supported at numerous points. Up to now, this was accomplished by superposing a relatively coarse support and a distribution gauze fastened to said support on which was attached the precious metal catalytic gauze. The support and distribution gauze must, however, be made of expensive, noble refractory alloys. Suggestions have indeed been made to use as the main support or as intermediate parts, non metallic refractory materials which are less expensive, but these materials have a low resistance to thermal shock.

Furthermore, parts made of refractory alloys comprising the main support are necessarily large and, as a result, because of temperature differences, undergo permanent deformations which often appear rapidly, thus making it necessary to frequently replace the support.

Taking into account the fact that catalytic gauzes are generally placed horizontally and in a flat position in cylindrical reactors, the simplest embodiment of a support for said gauzes would consist in stretching, in a crown, a network of refractory wires. But dimensional variations of the various parts of the support assembly must be compensated for if stresses which are very harmfull to the mechanical qualities of the catalytic gauzes are to be avoided. It would then be desirable that the network absorb these variations while remaining in the elastic range during the various phases comprising idle time ignition, normal operation and shutting off of the installation.

If, in a more concrete fashion, in the case contemplated above relating to the catalytic oxidation of ammonia, a cicular crown is used made of a metal alloy with a thermal expansion coefficient of the order of $18 \times 10^{-6}$, within which is directly attached a wire network and if it is desired that this network remain stretched in the elastic range during the various operating phases i.e.:

—ignition (crown at 150°C, network at 900°C)
—normal operation (crown at 400°C, network at 900°C)
—extinction (crown at 350°C, network at 50°C)
—idle phase (crown at 20°C, network at 20°C)

the alloy of which the wire is formed must have an elastic resistance and thermal expansion coefficient $\alpha$ which at least will satisfy precise conditions resulting from considerations developed hereinafter.

1. If the installation is considered at the end of the ignition period (crown at 150°C and network at 900°C), the diametrical wires have undergone an expansion of:

$$\frac{\Delta 1l}{l} = \alpha (900 - 20)$$

The crown has undergone a diametrical expansion of:

$$\frac{\Delta 2l}{l} = 18 \times 10^{-6} \times (150 - 20)$$

2. During normal operation (crown at 400°C, network at 900°C) the diametrical wires have the same natural expansion as above, but the crown has undergone an additional diametrical expansion of:

$$\frac{\Delta 3l}{l} = 18 \times 10^{-6} \times (400 - 150)$$

If in phase 1 above, the diametrical wires were stretched, at the beginning of the elastic range, and if it is required that in phase 2, they do not go beyond the end of the elastic range, the latter must extend over:

$$\frac{\Delta 3l}{l} = 18 \times 10^{-6} \times 250 \approx 0.45 \%$$

Consequently, with a Young's modulus of 15,000 at 900°C, the alloy, at 900°C should have an elastic resistance of:

$0.0045 \times 15,000 = 67.5$ kg/mm$^2$

However, there is no industrial alloy in existence at present which can support such a stress at 900°C while remaining within the elastic range.

3. If, however, there existed such an alloy, the diametrical wires would still have to resist the extinction phase (crown at 350°C, network at 50°C) thus giving:

a contraction of the diametrical wires of:

$$\frac{\Delta 4l}{l} = \alpha (900 - 50)$$

and an expansion of the crown of:

$$\frac{\Delta 5l}{l} = 18 \times 10^{-6}(350 - 150)$$

corresponding, with respect to phase 1, to an elongation of the diametrical wires of:

$$\frac{\Delta 6l}{l} = \frac{\Delta 4l}{l} + \frac{\Delta 5l}{l} = (\alpha\ 850) + (18 \times 10^{-6} \times 200)$$

Assuming that the yield strength of an industrial refractory alloy is at the maximum 100 kg/mm² at 50°C, the following holds for a YOUNG's modulus of 20,000 kg/cm² at 50°C.

$$\frac{100\ \alpha}{20\ 000} \geq \frac{\Delta 6l}{l}$$

which gives $\alpha \leq 1.65 \times 10^{-6}$.

However, there is no industrial refractory alloy in existence which has such an expansion coefficient.

Furthermore, in order for the assembly to have a normal industrial service life, the alloy must have good creep strength, i.e., it must not undergo, for example, an elongation greater than 1% in 10,000 hours.

It has been explained that some of the above mentioned condition do not exist. It will then be all the more possible to combine them together in a same alloy. Mathematically, an alloy with a Young's modulus of 5,000 would make it possible to meet all the required conditions if its creep strength would be sufficient, but such a modulus implies, by itself, a substantial drop in strength in the elastic range.

The main object of the invention is to provide a permeable, laminated, composite unit which meets the required conditions of elongation and contraction without being rapidly destroyed or damaged in operation.

This object is achieved by using, for constituting the support for the active material, such as a precious metal catalytic gauze, an "articulated" cloth comprising helixes consisting of wires made of a refractory metal alloy, assembled in a parallel direction with respect to one another through "screwing" of the adjacent helixes with one another, said cloth being stretched, with an extension of approximately 2% in length in all directions, in a frame of appropriate shape.

The frame may comprise a crown which is circular in the case contemplated above for the support of a catalytic gauze or rectangular if, for example, it is required to support a filtering sheet, or of any form adapted to the apparatus in which the assembly under consideration is used. It comprises advantageously several independent segments to which is connected the "articulated" cloth, said segments being themselves connected to an external continuous frame by tensile means.

The helixes forming the "articulated" cloth have a low pseudo-Young's modulus, although the Young's modulus of the wires forming said helixes has a high value and it is thus possible to meet the required conditions in order to provide, at a definitely lower price than before, a support, which, while remaining in the elastic range, can undergo a very substantial elongation, in all directions, this support, in its application to the oxidation of ammonia, absorbing strains due to the thermal expansion of the assembly and of the parts of the catalytic oven, including its own expansions, the cloth remaining continuously stretched without any appreciable bending during the ignition, normal operating, extinction and idle periods.

Furthermore, the resting points of the catalytic gauzes on such a support are very numerous and pin-pointed, which decreases, to an appreciable extent, turbulences of gas streams and increases the useful surface area of the catalyst, which are two very important advantages enhancing the chemical conversion yield of $NH_3$ to $NO$.

The same advantages are found, with the required changes being made, in the application of this support to the other units contemplated, such as filtering units and, in general, in the uses of the units according to the invention in processes where the temperatures go from room temperature not only to high values, as indicated above, but also to very low values.

The appended drawings show, by way of examples, various embodiments of the support in a unit according to the invention. In said drawings.

Figure 1:
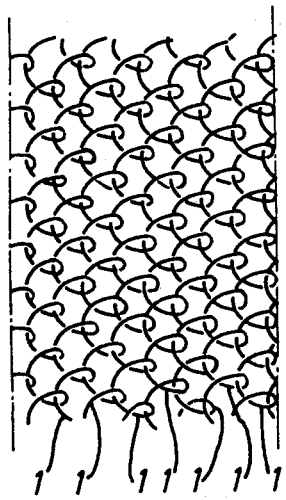
FIG. 1 is a diagrammatic plan view of a fragment of "articulated" cloth.
Figure 2:
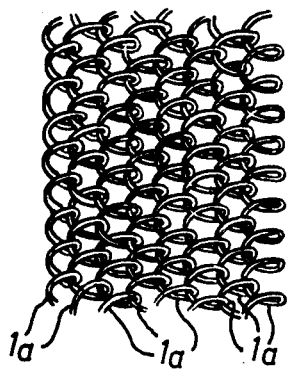
FIG. 2 is a similar view of another embodiment of such a cloth.

As shown in FIGS. 1 and 2, the support used in the unit according to the invention is formed of an "articulated" cloth consisting of wires rolled into helixes 1, 1a, each helix being engaged with its two neighbours by mutual "screwing" Such cloths are known per se in their application to the manufacture of metal bed frames.

Each helix may comprise only one wire, as shown at 1 in FIG. 1, or several wires, for example two wires as shown at 1a in FIG. 2, the second solution providing greater elasticity for the same given total wire cross-section.

Figure 3:
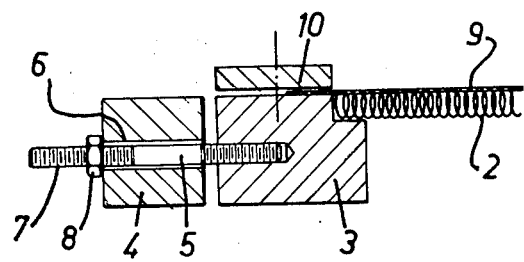
FIG. 3 is a partial view, in vertical cross-section, of a unit according to the invention applied to the catalytic oxidation of ammonia.

In the embodiment of the laminated unit such as shown in FIG. 3, a sheet of "articulated" cloth 2, which for example is circular, is welded by its edges on segments of crown 3 which are made integral with an external continuous crown 4 through anchors 5, screwed into segments 3 in a parallel direction with the bisectric of the latter and passing through corresponding holes 6 provided in the external crown 4, the free end of these anchors being threaded at 7 so as to receive a nut 8 which serves to give cloth 2 the required prestress. A catalytic gauze 9, made of precious metal, whose edges are maintained by segments 3 through pinching with arc-shaped plates 10 screwed onto said segments, rests on "articulated" cloth 2, in contact with the tops of each of the turns of the helixes comprising the latter, and therefore on resting points which are extremely numerous and close to one another.

It can be imagined that any other mode of attachment of cloth 2 on segments 3 could be adopted, for example, pinching as in the case of catalytic gauze 9, hooking onto hooks or points, etc.

The materials comprising the assembly are chosen as a function of the operating temperature and chemical conditions of the chamber in the catalytic oven or other processing equipment. Thus, in the oxidation of ammonia to nitric oxide, a refractory alloy Fluginox N 45 was used for the preparation of wires having a diameter of 0.75mm, this alloy showing very good creep strength.

The chemical composition of the refractory alloy Fluginox N 45 is as follows: ≤0.12% carbon, < 1.5% silicon, <1% manganese, 18 to 21% chromium, 15 to 21% cobalt, 1.8 to 3.0% titanium, 0.7 to 1.8% aluminum, <0.1% copper, ≤ 2% iron, and the balance up to 100% of nickel. Said wires were formed in pairs of helical coils having a diameter of 10 mm with a 15 mm pitch. The double coils were screwed into one another so as to constitute the cloth. The pressure in the catalytic chamber has no bearing on the behavior of the cloth, and it may have any value. Such a cloth can withstand, in the cold, a prestress substantially greater than 2%, its expansion coefficient being $18 \times 10^{-6}$ and its YOUNG's modulus close to 10, which is of course much lower than the value of 5,000 which is the upper limit required according to the calculation presented hereinabove.

In the same way, a refractory alloy Inconel × 750 was used for the preparation of the wires, in the preparation of nitric acid in a catalysis furnace. The chemical composition of the refractory alloy Inconel × 750 is as follows: ≤ 0.08% carbon, 14 to 17% chromium, 2.25 to 2.75% titanium, 0.4 to 1% aluminum, ≤ 0.5% silicon, 5 to 9% iron, ≤ 1% manganese, ≤ 0.5% copper, 0.7 to 1.2% niobium (with a low content of tantalum), ≤ 0.01% sulfur, and 70% nickel (with a low content of cobalt).

We claim:

1. In a process for gaseous chemical or physical processes operated over a wide range of temperatures employing a fragile sheet of material chemically or physically active in the process, the improvement comprising a lattice support formed of an articulated cloth consisting of helixes of wire made of a refractory metal alloy, said helixes being assembled parallel to each other by screwing the adjacent helixes with one another, said cloth being stretched in an appropriately shaped frame with an extension of about 2% in length in all directions.

2. The process of claim 1 wherein said frame is formed of a plurality of independent segments to which is connected the "articulated" cloth, said segments being themselves connected to an external continuous frame through tensile means.

3. The process of claim 1, wherein said metal alloy does not undergo elongation greater than 1% in 10,000 hours.

* * * * *

UNITED STATES PATENT OFFICE
CERTIFICATE OF CORRECTION

Patent No. 3,874,645      Dated April 1, 1975

Inventor(s) GERARD AGUINET, JEAN MANOURY and EDOUARD MARTIN

It is certified that error appears in the above-identified patent and that said Letters Patent are hereby corrected as shown below:

| Col. | Patent Line | |
|---|---|---|
| | | UNDER ASSIGNEE: |
| | | "Societe Anonyme Products Chimiques Ugine Kyhlman, Paris, France" |
| | | should be |
| | | --Societe Anonyme Produits Chimiques Ugine Kuhlmann, Paris, France-- |
| 2 | 25 | "$\frac{\Delta 1 1}{1}$ = α (900-20)" should be |
| | | --$\frac{\Delta 1 \ell}{\ell}$ = α (900-20)-- |
| 2 | 30 | "$\frac{\Delta 2 1}{1}$ = 18 x 10$^{-6}$ x (150-20)" should be |
| | | --$\frac{\Delta 2 \ell}{\ell}$ = 18 x 10$^{-6}$ x (150-20)-- |

UNITED STATES PATENT OFFICE
CERTIFICATE OF CORRECTION

Patent No. 3,874,645      Dated April 1, 1975

Inventor(s) GERARD AGUINET, JEAN MANOURY and EDOUARD MARTIN

It is certified that error appears in the above-identified patent and that said Letters Patent are hereby corrected as shown below:

| Patent Col. | Line | |
|---|---|---|
| 2 | 40 | "$\frac{\Delta 31}{1} = 18 \times 10^{-6} \times (400-150)$" should be -- $\frac{\Delta 3\ell}{\ell} = 18 \times 10^{-6} \times (400-150)$ -- |
| 2 | 50 | "$\frac{\Delta 31}{1} = 18 \times 10^{-6} \times 250 \approx 0.45\%$" should be -- $\frac{\Delta 3\ell}{\ell} = 18 \times 10^{-6} \times 250 = 0.45\%$ -- |
| 2 | 65 | "$\frac{\Delta 41}{1} = \alpha (900-50)$" should be -- $\frac{\Delta 4\ell}{\ell} = \alpha (900-50)$ -- |
| 3 | 1 | "$\frac{\Delta 51}{1} = 18 \times 10^{-6} (350-150)$" should be -- $\frac{\Delta 5\ell}{\ell} = 18 \times 10^{-6} (350-150)$ -- |

UNITED STATES PATENT OFFICE
CERTIFICATE OF CORRECTION

Patent No. 3,874,645　　　　　　　　　Dated April 1, 1975

Inventor(s) GERARD AGUINET, JEAN MANOURY AND EDOUARD MARTIN

It is certified that error appears in the above-identified patent and that said Letters Patent are hereby corrected as shown below:

| Col. | Patent Line | |
|---|---|---|
| 3 | 10 | "$\frac{\Delta 61}{1} = \frac{\Delta 41}{1} + \frac{\Delta 51}{1}$" should be $-- \frac{\Delta 6i}{i} = \frac{\Delta 4i}{i} + \frac{\Delta 5i}{i} --$ |
| 3 | 18 | "$\frac{100\,\alpha}{20,000} \geqslant \frac{\Delta 61}{1}$" should be $-- \frac{100\,\alpha}{20,000} \geqslant \frac{\Delta 6i}{i} --$ |
| 6 | Claim 1 | after "support" insert --for said sheet of material-- |

Signed and sealed this 1st day of July 1975.

(SEAL)
Attest:

RUTH C. MASON
Attesting Officer

C. MARSHALL DANN
Commissioner of Patents
and Trademarks